J. J. CLUIN.
MINER'S CANDLESTICK.
APPLICATION FILED OCT. 13, 1909.

951,595.

Patented Mar. 8, 1910.

Witnesses
A. A. Olson
W. E. Smith

Inventor:
John J. Cluin
by Joshua R. H. Potts
his Attorney.

UNITED STATES PATENT OFFICE.

JOHN J. CLUIN, OF CHICAGO, ILLINOIS.

MINER'S CANDLESTICK.

951,595.   Specification of Letters Patent.   Patented Mar. 8, 1910.

Application filed October 13, 1909. Serial No. 522,411.

*To all whom it may concern:*

Be it known that I, JOHN J. CLUIN, a citizen of the United States, residing at Chicago, county of Cook, and State of Illinois, have invented certain new and useful Improvements in Miners' Candlesticks, of which the following is a specification.

My invention relates to miners' candle sticks and the object of my invention is the provision of a candle stick of the character mentioned which may be readily foldable to occupy a small compass so as to facilitate ready transportation thereof, and which may be arranged so as to be applicable to be held in either right or left hand or for arrangement upon a right or left wall.

A further object is the provision of a candle stick as mentioned which will be of strong, durable, and economical construction.

Other objects will appear hereinafter.

With these objects in view my invention consists in a candle stick characterized as above mentioned and in certain details of construction and arrangement of parts all as will be hereinafter fully described and particularly pointed out in the appended claims.

Figure 1:
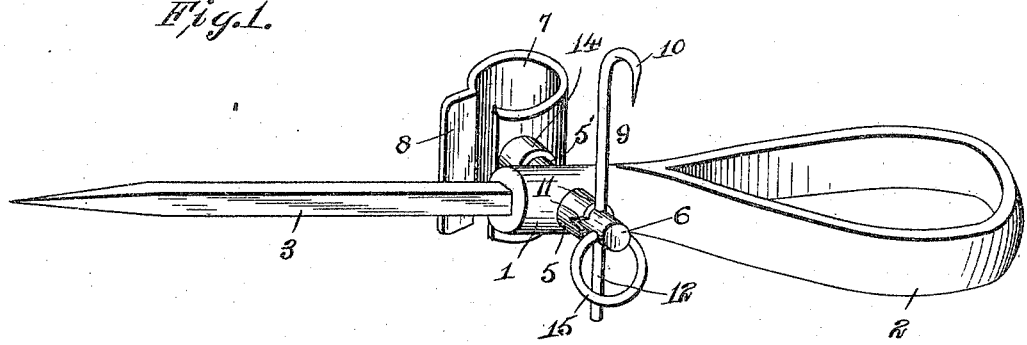
Figure 2:
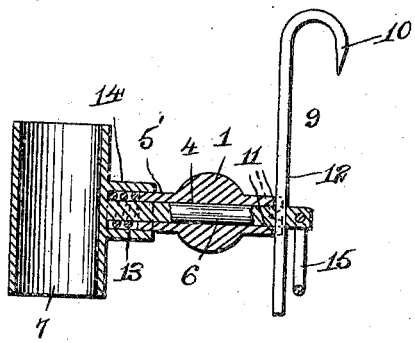

My invention will be more readily understood by reference to the accompanying drawings forming a part of this specification, and in which, Figure 1 is a perspective view of my device in its preferred form, and Fig. 2 is a central transverse section thereof.

Referring now to the drawings, 1 indicates the shank of the candle stick formed at one end of which is an integral handle 2 and rigidly secured in and projecting from the other end thereof a hardened point 3. Substantially centrally formed through the shank 1 is a transversely extending circular perforation 4, and formed integrally with and laterally projecting from said shank in axial alinement with the perforation 4, bosses 5—5'. Having its shank 6 extending through and rotatably mounted in the perforation 4 and bosses 5—5' is a candle holder 7 formed, as shown, of a resilient short split tube. One edge 8 of the tube is bent outwardly to form a finger engagement whereby the holder may evidently be readily enlarged so as to permit of the insertion of a candle therein, the latter being held in position in the holder because of the inwardly directed force of the latter thereon when the finger engagement 8 is released. Secured in the outer end of the shank 6, the same being disposed in planar alinement with the axis of the holder 7, is a transversely extending hook member 9, the latter being so arranged that the hooked end 10 thereof may engage a projecting ledge or boss to suspend the device therefrom. Formed in the outer extremity of the boss 5 adjacent the hook member 9 is a plurality of preferably V-shaped notches 11 oppositely positioned of which are adapted to be engaged by the shank 12 of the hook member. A compression spring 13 inclosed in the housing 14 formed upon and laterally projecting from the candle holder 7, the respective extremities thereof engaging the latter and the outer extremity of the boss 5', is evidently adapted to hold the hook shank 12 in engagement with the notches 11.

By means of a finger ring 15 the shank 6 may be drawn laterally in its bearing against the tension of the spring 13 and hence said hook shank withdrawn from the notches 11, whereupon said hook member and the candle holder may be rotated into planar alinement with the handle 2 and point 3, for transportation or storage.

The device as illustrated is arranged for holding in the left hand, but by inverting the candle holder and hook member by rotating the shank 6 as before stated, it may evidently be readily arranged for holding in the right hand.

While I have shown what I deem to be the preferred form of my device I do not wish to be limited thereto as there might be various changes made in the details of construction and arrangement of parts without departing from the spirit of the invention comprehended within the scope of the appended claims.

Having described my invention what I claim as new and desire to secure by Letters Patent is:

1. A miner's candle stick comprising a shank, a handle formed at one end of said shank and a point provided at the other, a candle holder having its shank transversely extending through and rotatably mounted in said first named shank, a supporting hook member having its shank extending through and secured in the outer end of the shank of said candle holder, a boss projecting from said first named shank encircling said shank of said candle holder, notches formed in the outer extremity of said boss adapted to be engaged by the shank of said hook, and a compression spring for holding said hook-shank in engagement with said notches, substantially as described.

2. A miner's candle stick comprising a shank, a handle formed at one end of said shank and an alining point provided at and projecting from the other end, a candle holder comprising a resilient split tube, a laterally projecting shank of said tube transversely extending through and being rotatably mounted in said first named shank, a supporting hook member having its shank secured in the outer end of the shank of said candle holder, a boss laterally projecting from said first named shank, notches provided in the outer end of said boss adapted to be engaged by the shank of said supporting hook, and a compression spring engaging said candle holder for holding said shank of said supporting hook in engagement with said notches, substantially as described.

3. A miner's candle stick comprising a shank, a handle formed at one end of said shank and an alining point secured in and projecting from the other end, a candle holder comprising a resilient split tube, one of the contiguous longitudinal edges of said tube being bent outwardly, a shank laterally projecting from said holder, said shank extending transversely through and being rotatably mounted in said first named shank, a supporting hook having its shank fixedly secured in and transversely extending through said candle-holder-shank, the axis of said candle holder and of said hook shank being disposed in planar alinement, bosses laterally projecting from said first named shank encircling said candle-holder-shank, a plurality of notches provided in the outer end of one of said bosses adapted to be engaged by said supporting hook-shank, a coil compression spring mounted upon said candle-holder-shank having its respective ends engaging said holder and the outer extremity of the other of said bosses, said spring being adapted to yieldingly hold said hook member in said notches, a housing for said spring formed upon said holder, and an engaging ring provided at the outer end of said candle-holder-shank, substantially as described.

In testimony whereof I have signed my name to this specification in the presence of two subscribing witnesses.

JOHN J. CLUIN.

Witnesses:
 HELEN F. LILLIS,
 JOSHUA R. H. POTTS.